US010389591B2

(12) United States Patent
Merk et al.

(10) Patent No.: US 10,389,591 B2
(45) Date of Patent: Aug. 20, 2019

(54) AUTONOMOUS CONFIGURATION SYSTEM FOR A SERVICE INFRASTRUCTURE

(71) Applicant: Microsoft Technology Licensing, LLC, Redmond, WA (US)

(72) Inventors: Joel Maximilian Merk, Bellevue, WA (US); Hang Kwong Lee, Issaquah, WA (US); Aleksandr Mikhailovich Gershaft, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 463 days.

(21) Appl. No.: 15/338,128

(22) Filed: Oct. 28, 2016

(65) Prior Publication Data

US 2018/0123890 A1 May 3, 2018

(51) Int. Cl.
*G06F 9/50* (2006.01)
*H04L 12/24* (2006.01)
(Continued)

(52) U.S. Cl.
CPC ........ *H04L 41/0886* (2013.01); *G06F 9/5077* (2013.01); *H04L 41/08* (2013.01);
(Continued)

(58) Field of Classification Search
CPC ... G06F 15/177; H04L 41/08; H04L 41/0803; H04L 41/0886
(Continued)

(56) References Cited

U.S. PATENT DOCUMENTS 6,286,038 B1 * 9/2001 Reichmeyer ........ H04L 41/0213
709/220
7,912,749 B2 * 3/2011 Wong .................... G06Q 10/06
717/104
(Continued)

FOREIGN PATENT DOCUMENTS

EP 2547043 A1 1/2013

OTHER PUBLICATIONS

Simone, et al., "A Scalable and Self-Configuring Architecture for Service Discovery in the Internet of Things", IEEE Internet of Things Journal, https://ieeexplore.ieee.org/abstract/document/6899579, vol. 1, Issue 5, Oct. 2014, 14 pages.*
(Continued)

*Primary Examiner* — Tonia L Dollinger
*Assistant Examiner* — Adam A Cooney
(74) *Attorney, Agent, or Firm* — Shook, Hardy & Bacon, L.L.P.

(57) ABSTRACT

Various methods and systems for implementing an autonomous configuration system for configuring a service infrastructure are provided. An autonomous configuration system implements a service infrastructure configuration manager to identify discovered configuration data. The discovered configuration data supports circumventing a routing protocol for service infrastructure communications via an edge infrastructure, such that, the service infrastructure is alternatively configured to access remote configuration data based on the discovered configuration data. The discovered configuration data is discovered based an autonomous discovery service (e.g., sniffing service or a casting service). An initial configuration state is configured in the service infrastructure, based on the discovered configuration data. The service infrastructure can communicate with a service provider infrastructure associated with the service infrastructure
(Continued)

to access the remote configuration data. The service infrastructure configuration manager accesses the remote configuration data and uses the remote configuration data to configure a final configuration state in the service infrastructure.

20 Claims, 7 Drawing Sheets

(51) Int. Cl.
 H04L 29/08 (2006.01)
 G06F 15/177 (2006.01)
 H04L 12/771 (2013.01)
(52) U.S. Cl.
 CPC ...... *H04L 41/0803* (2013.01); *H04L 41/0806* (2013.01); *H04L 45/563* (2013.01); *G06F 15/177* (2013.01); *H04L 41/0853* (2013.01); *H04L 67/10* (2013.01)
(58) Field of Classification Search
 USPC .......................................................... 709/222
 See application file for complete search history.

(56) References Cited

U.S. PATENT DOCUMENTS

| 7,934,248 | B1* | 4/2011 | Yehuda | H04L 41/069 |
| | | | | 709/224 |
| 8,688,792 | B2* | 4/2014 | Singh | G06F 9/4856 |
| | | | | 709/206 |
| 2006/0037000 | A1* | 2/2006 | Speeter | H04L 67/125 |
| | | | | 717/120 |
| 2006/0179116 | A1* | 8/2006 | Speeter | G06F 8/71 |
| | | | | 709/217 |
| 2008/0281607 | A1* | 11/2008 | Sajja | G06Q 10/06 |
| | | | | 705/1.1 |
| 2014/0096208 | A1* | 4/2014 | Buck | G06F 16/176 |
| | | | | 726/5 |
| 2016/0254957 | A1* | 9/2016 | Maes | G06F 9/5072 |
| | | | | 709/223 |
| 2017/0024450 | A1* | 1/2017 | Narayanan | G06F 16/275 |
| 2017/0195201 | A1* | 7/2017 | Mueller | H04L 43/0817 |

OTHER PUBLICATIONS

"International Search Report and Written Opinion Issued in PCT Application No. PCT/US2017/057774", dated Jan. 30, 2018, 11 Pages.

* cited by examiner

AUTONOMOUS CONFIGURATION SYSTEM FOR A SERVICE INFRASTRUCTURE

BACKGROUND

Large-scale networked systems are commonplace platforms employed in a variety of settings for running applications and maintaining data for business and operational functions. For instance, a datacenter (e.g., physical cloud computing platform) may provide a variety of services (e.g., web applications, email services, search engine services, etc.) for a plurality of customers simultaneously. These large-scale networked systems typically include a large number of resources distributed throughout the data center or throughout multiple datacenters in a region or multiple regions across the globe. Resources can resemble a physical machine or a virtual machine (VM) running on a physical node or host. The datacenter runs on hardware (e.g., power supplies, racks, and Network Interface Controllers (NIC)) and software components (Applications, Application Programming Interfaces (APIs), SQL Databases) that rely on each other to operate. In this regard, datacenters provide housing for computing systems and associated components—collectively referred to as an infrastructure or service infrastructure. The service infrastructure can support compute and storage operations for a variety of compute workloads and operations. The service infrastructure can be installed in datacenters that are wholly-owned and operated by a service provider or entity and also in datacenters not wholly-owned or operated by the service provider. A service provider may refer to the latter datacenter as an edge datacenter or edge infrastructure. In either case, a service infrastructure has to be properly provisioned and configured in order to operate to support different services. As such, processes to support service infrastructure provisioning are integral to the deployment of service infrastructures to datacenters.

SUMMARY

Embodiments described herein provide methods and systems for implementing an autonomous configuration system for configuring service infrastructures. A service infrastructure includes computing systems and associated components—hardware and software—that support compute and storage operations from a datacenter where the service infrastructure is deployed. At a high level, an autonomous configuration system implements a service infrastructure configuration manager to identify discovered configuration data or utilize casting configuration data for a service infrastructure. The discovered configuration data or the casting configuration data supports circumventing a routing protocol for service infrastructure communications via an edge infrastructure. The service infrastructure is alternatively configured based on the discovered configuration data or the casting configuration data to access remote configuration data at a service provider infrastructure to configure the service infrastructure.

The discovered configuration data is discovered based on an autonomous discovery service (e.g., sniffing service) that leverages a waiting state of the edge infrastructure and a pre-configured state of the service infrastructure to identify the discovered configuration data. The casting configuration data is utilized based on an autonomous casting service (e.g., casting service) that leverages a casting IP address to peer the service infrastructure with the edge infrastructure, making the service infrastructure internet accessible. Based on the discovered configuration data or the casting configuration data, an initial configuration state is configured in the service infrastructure. The service infrastructure can then communicate with a service provider infrastructure associated with the service infrastructure to access the remote configuration data. The service infrastructure configuration manager accesses the remote configuration data from the service provider infrastructure and uses the remote configuration data to configure a final configuration state in the service infrastructure.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
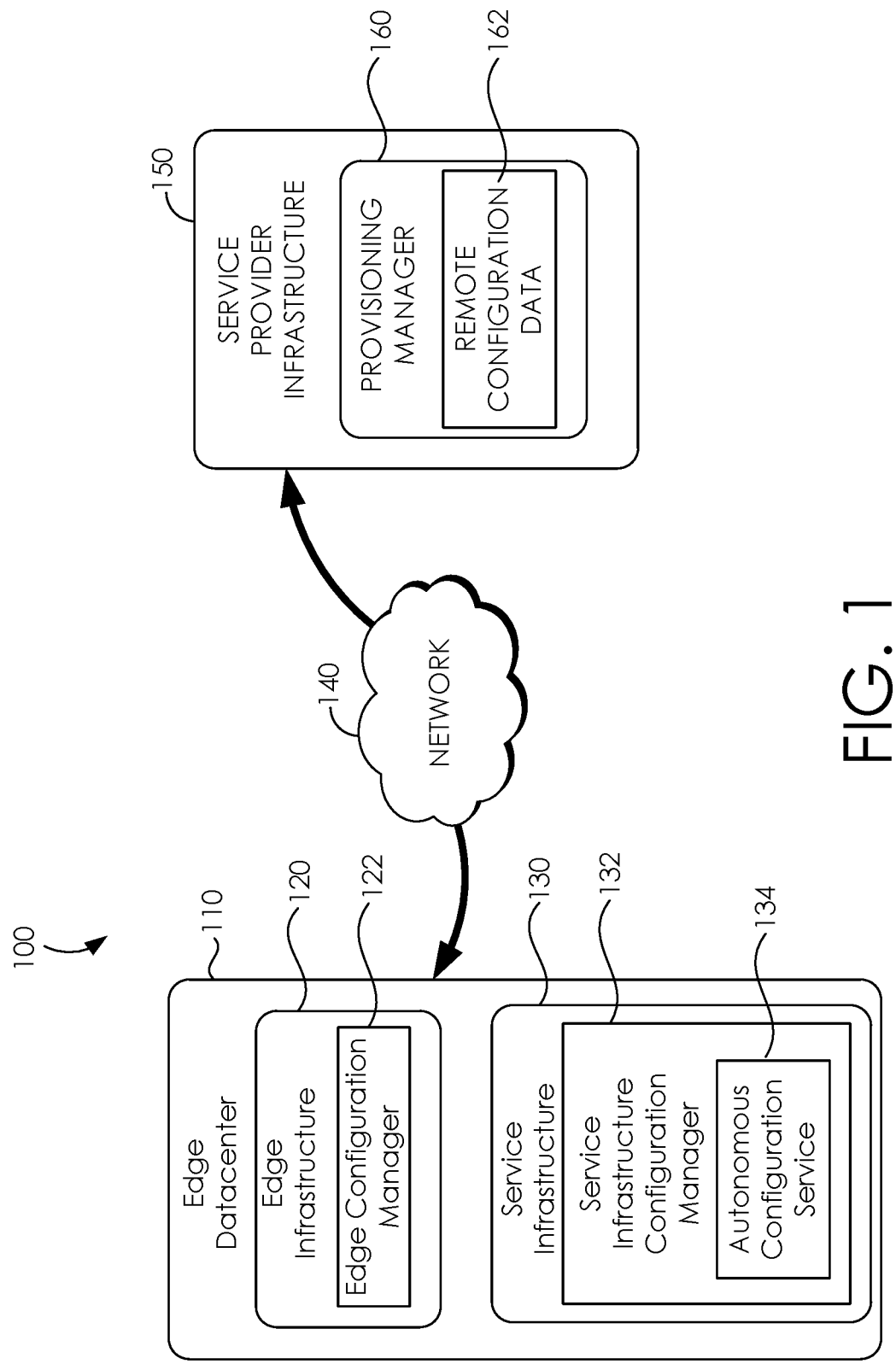
FIG. 1 is a block diagram of an exemplary distributed computing infrastructure and autonomous configuration system, in accordance with embodiments described herein.

Datacenters can provide housing for computing systems and associated components—collectively referred to as an infrastructure or service infrastructure. The service infrastructure can support compute and storage operations for a variety of compute workloads and operations. The service infrastructure can be installed in datacenters that are wholly-owned and operated by a service provider or entity and also in datacenters not wholly-owned or operated by the service provider. A service provider may refer to the latter datacenter as an edge datacenter or edge infrastructure. In either case, a service infrastructure has to be properly provisioned and configured in order to operate to support different services. For example, a service infrastructure has to be configured with location-specific network configuration to operate correctly.

Service infrastructure that is to be deployed into a datacenter often does not have the network configuration of the datacenter where the service infrastructure is to be installed. For example, a top-of-rack switch (TOR) lacks the network configuration of the datacenter to connect to the edge infrastructure to access datacenter resources or external resources. Access to the datacenter network supports accessibility of the service infrastructure to datacenter resources and external resources. With network access, a service infrastructure can communicate with a service provider infrastructure to receive configuration data. As such, the service infrastructure has to be configured to connect to the datacenter network and to have access to the datacenter resources and external resources.

Conventional methods for configuring a service infrastructure in a datacenter have several shortcomings because of the resource-intensive processes involved in configuring service infrastructures in datacenters. For example, a TOR switch requires manual configuration of the service infrastructure with significant human intervention, which can be time consuming, inefficient, and susceptible to human error. In one exemplary implementation, an alternate channel to the TOR switch can be configured by an operator to access and configure the TOR switch to communicate with the service provider infrastructure. The alternate channel can be configured using an additional network card, a server (e.g., blade server) with a configuration OS, and an operator accessing the server to configure the TOR. In addition, a datacenter that is not wholly-owned by a cloud service provider lacks pre-existing administrator infrastructure that could facilitate configuration of a service infrastructure.

Another exemplary implementation might include allowing the edge infrastructure provider to have access to configuration information of a service provider using the edge infrastructure; however, the configuration information is confidential and sharing such confidential information can open the service provider to unnecessary risk. Other variations and combinations of shortcomings exist with conventional methods for configuring a service infrastructure. As such, processes to support service infrastructure provisioning are integral to the deployment of service infrastructures to datacenters.

Embodiments described herein provide simple and efficient methods and systems for implementing autonomous configuration system for service infrastructures. A service infrastructure includes computing systems and associated components—hardware and software—that support compute and storage operations from a datacenter where the service infrastructure is deployed. As an initial matter, a service infrastructure is shipped to the edge datacenter. The service infrastructure, for purposes of providing a detailed description, is a service infrastructure maintained in a rack. The rack includes a standard frame for mounting equipment includes blades (i.e., modularized server computer), power and network components. The rack can specifically include a switch (e.g., a top of rack switch or TOR switch). The service infrastructure rack is installed (e.g., connecting power and network cables) at the edge datacenter based on service provider specifications. The edge datacenter includes an edge infrastructure that includes a network device (e.g., edge infrastructure switch) that supports connecting the service infrastructure to the edge infrastructure. The service infrastructure is associated with a service provider that manages the service infrastructure and the edge infrastructure is associated with an edge infrastructure provider that manages the edge infrastructure.

At a high level, the autonomous configuration system supports a mechanism for a service provider to configure a service infrastructure in a datacenter. In particular, the service provider can have their service infrastructure automatically and autonomously configured in an edge datacenter or edge infrastructure that is not owned and/or controlled by the service provider. The autonomous configuration system may operate based on a service infrastructure (e.g., service infrastructure configuration manager) of the autonomous configuration system automatically discovering at least a portion of the service infrastructure configuration data (e.g., discovered configuration data) or automatically utilizing casting configuration data (e.g., a casting IP address) and configuring the service infrastructure (e.g., initial configuration state) based on the discovered configuration data or the casting configuration data. The discovered configuration data can be identified based on the edge infrastructure (e.g., edge infrastructure configuration manager or switch) that is configured for a routing protocol. The casting configuration data can be utilized based on a casting IP address from the service infrastructure provider (e.g., an anycast IP address utilized by the casting service or switch). The edge infrastructure, in either case, maintains the routing protocol configuration data for configuring the service infrastructure. The edge infrastructure configuration manager maintaining the routing protocol configuration data may include the edge infrastructure (e.g., a switch) configured based on the routing protocol configuration data. The edge infrastructure can also store a portion of a service infrastructure portion of the routing protocol configuration data, where the routing protocol configuration data allows a switch of the service infrastructure to communicate with a switch of the edge infrastructure based on the routing protocol.

By way of background, the edge infrastructure may operate based on a predefined routing protocol (e.g., Border Gateway Protocol) associated with the routing protocol configuration data. A fully finally configured service infrastructure, at an edge datacenter, also operates with the edge infrastructure based on the routing protocol. The routing protocol refers to an exterior gateway protocol for routing information between systems (e.g., autonomous networks or service providers) on the internet. The routing protocol makes routing decisions on paths, network policies, or rule-sets defined for reachability between systems. As such, by way of example, a BGP link, in a fully finally configured service infrastructure, exists between a switch of the service infrastructure and a switch of the edge infrastructure. In this regard, routing protocol configuration data can refer to edge infrastructure configuration data and service infrastructure configuration data that support BGP and a link between the edge infrastructure and service infrastructure using BGP. The edge infrastructure switch can be configured with the edge infrastructure configuration data. The edge infrastructure may be preconfigured (e.g., a waiting state and performing waiting state operations) to communicate with the service infrastructure using the routing protocol; however, with embodiments described herein, the edge infrastructure and routing protocol are exploited or circumvented (e.g., via an autonomous discovery service or an autonomous casting service) to identify the discovered configuration data or utilize the casting configuration data, respectively, instead.

The discovered configuration data from the autonomous discovering service (e.g., sniffing service) or the casting configuration data from the autonomous casting service allows the service infrastructure to be partially provisioned (e.g., initial configuration state). The service infrastructure can then communicate with a service provider infrastructure (e.g., service provider cluster) to access provisioning data (e.g., remote configuration data). The service provider infrastructure can communicate provisioning data to the service infrastructure at the edge datacenter. The remote configuration data allows the service infrastructure to be fully provisioned (e.g., final configuration state). The autonomous configuration system configures the service infrastructure based on an autonomous configuration framework that includes the initial configuration state and the final configuration state, and in embodiments, an intermediate configuration state for security purposes. The intermediate configuration state includes the service infrastructure being provisioned using an incremental provisioning process based at least in part on security checks that have to be met as part of the incremental provisioning process, as described herein in more detail.

In operation, the autonomous configuration system can support two different types of implementations: an autonomous discovery service and an autonomous casting service corresponding to a sniffing-based process and a casting-based process, respectively. A service infrastructure configuration manager can support either one or both of the autonomous configuration implementations based on a sniffing service and a casting service, respectively.

With reference to the sniffing-based process, the sniffing-based process supports configuration of the service infrastructure based on a packet-sniffing methodology that allows the service infrastructure to inspect traffic packets from the edge infrastructure to identify service infrastructure configuration data (e.g., discovered configuration data). The discovered configuration data is used to configure the service infrastructure. The sniffing-based process utilizes the edge infrastructure announcements of the edge infrastructure's presence to identify the discovered configuration data and circumvent, at least temporarily, direct configuration over the routing protocol.

The sniffing-based process can be described in more detail by way of example, which is not meant to be limiting. The sniffing-based process leverages the edge infrastructure's (e.g., edge infrastructure configuration manager or switch) actions, when the edge infrastructure is configured with the routing protocol configuration data, to identify portions of a service infrastructure configuration data (i.e., discovered configuration data). The edge infrastructure (e.g., switch) can be configured in a waiting state (e.g., a BGP-based state) that includes initiating and performing neighbor discovery operations (e.g., Internet Control Message Protocol—ICMPv6 Neighbor Discovery requests and Address Resolution Protocol—ARP requests). In an exemplary implementation, the waiting state can support IPv4 or IPv6 configuration of the service infrastructure and further includes reserving IP addresses (e.g., at least 2 IP addresses—one each for the edge infrastructure and the service infrastructure TOR). The edge infrastructure, in its waiting state, periodically sends out data packets and listens for a response from an expected service infrastructure for direct configuration over the routing protocol. Basically, the edge infrastructure is anticipating to discover who (e.g., a switch) to communicate with from the service infrastructure. However, without any manual intervention, the service infrastructure (e.g., service configuration manager or server) monitors data traffic and inspects the data packets to discover and extract at least portions (e.g., discovered configuration data) of the service infrastructure configuration data. The service infrastructure can be in a pre-configuration state that allows the service infrastructure to monitor data traffic. For example, the service infrastructure TOR switch may be configured in a transparent state to forward all traffic to a server on the rack, where the server includes the service infrastructure configuration manager that supports identifying the discovered configuration data. The discovered configuration data (e.g., a reserved IP address for the server) can be used to autonomously configure (e.g., initial configuration state) the service infrastructure.

Autonomous configuration includes initializing the service infrastructure into an initial configuration state. In particular, during an initial configuration state, the service infrastructure configuration manager communicates with a service provider infrastructure via the edge infrastructure while bypassing configuration of the TOR switch with routing protocol configuration data. The reserved IP address for the service infrastructure is an internet accessible IP address which the edge infrastructure trusts that any device using the IP address is allowed access to the internet based on the IP address. The initial configuration state includes the service infrastructure configuration manager accessing the service provider infrastructure to retrieve remote configuration data, as described herein in more detail.

With reference to the casting-based process, the casting-based process supports configuration of the service infrastructure based on a network addressing and routing methodology (e.g., anycast) that allows a service infrastructure to be accessible, via an edge infrastructure, by the service infrastructure provider using casting configuration data (e.g., any cast, casting IP address, etc.). The casting configuration data is used to configure the service infrastructure and a casting IP address of the casting configuration data is utilized by the service infrastructure to peer with the edge infrastructure. Peering can refer to creating an interconnection between separate networks to exchange traffic. The casting-based process utilizes the edge infrastructure peered with the service infrastructure based on the casting IP address to provide the service infrastructure with internet accessibility. With internet accessibility, the service infrastructure broadcasts the casting IP address, such that, the service provider infrastructure can communicate with the service infrastructure to circumvent, at least temporarily, direct configuration over the routing protocol.

The casting-based process can be described in more detail by way of example, which is not meant to be limiting. The casting-based process leverages casting configuration data (e.g., casting IP address) and a casting service to configure the service infrastructure (e.g., a TOR switch) with a casting IP address (e.g., anycast IP address). For example, the service infrastructure can be in a pre-configuration state, where the service infrastructure is configured with the anycast IP address. The anycast IP address supports the peering with the edge infrastructure based on the anycast IP address. The edge infrastructure is in a waiting state until the anycast IP address is used to peer with the edge infrastructure with the service infrastructure. In an exemplary implementation, the casting IP address (or casting IP address range) allows routing of data between nearest devices that have the same casting IP address configuration and then the edge infrastructure is then peered with the service infrastructure. In particular, the edge infrastructure peers with the service infrastructure using the anycast IP address. The service infrastructure is internet accessible via the edge infrastructure and can broadcast based on the anycast IP address and internet accessibility.

Autonomous configuration includes initializing the service infrastructure into an initial configuration state. The casting-based process leverages peering of a service infrastructure and an edge infrastructure to configure an initial configuration state (e.g., peered with the edge infrastructure and internet accessibility) in the service infrastructure. The service infrastructure in the initial configuration state further includes the service infrastructure broadcasting via the internet with anycast IP address, which a service provider infrastructure can utilize to configure the service infrastructure. In the initial configuration state, the edge infrastructure can receive communications from a service provider infrastructure via the anycast IP address. The service provider infrastructure (e.g., a predefined remote configuration data location) communicates to the service infrastructure in response to the broadcasting via the casting IP address for provisioning. In this regard, the edge infrastructure and the service infrastructure circumvent direct configuration using the routing protocol. The service provider infrastructure (that includes provisioning manager and remote configuration data) can now reach the service infrastructure via the anycast IP address. In particular, the service provider infrastructure can reach the TOR switch without human intervention to configure the TOR switch and the service infrastructure with the remote configuration data, as described herein in more detail.

The service infrastructure can be configured with remote configuration data. The remote configuration data can be provided from the service provider infrastructure (e.g., a cluster) to further configure the service infrastructure. Remote configuration data can refer to different types of computing configurations and settings for the service infrastructure such that the service infrastructure can operate appropriately and provide access to technology resources. Remote configuration data can also allow a service provider to manage the service infrastructure. The remote configuration data can include hardware and software configurations for the service infrastructure. For example, the remote configuration data can include network configurations that support intra-rack and extra-rack communications. Other types of variations and combinations of remote configuration data are contemplated with embodiments of the present disclosure.

The autonomous configuration system configures the service infrastructure based on an autonomous configuration framework that includes the initial configuration state and the final configuration state, and in embodiments, an intermediate configuration state for security purposes. The intermediate configuration state includes the service infrastructure being provisioned using an incremental provisioning process based at least in part on security checks that have to be met as part of the incremental provisioning process. The incremental provisioning processing operates to establish a trust between the service infrastructure and the service provider infrastructure (e.g., via an intermediate service provider infrastructure having intermediate remote configuration data). The intermediate remote configuration data can be communicated to service infrastructure in the initial configuration state where the intermediate remote configuration data is used to initialize an intermediate configuration state (e.g., trust establishing state).

The intermediate configuration state can be based on any variations and combinations of trusted computing (e.g., endorsement key, memory curtaining, sealed storage, remote attestation, trusted third party, etc.) used to support communications between service infrastructure and the service provider infrastructure. After a trust has been established during the trust establishing state, then further communications can occur with the primary service infrastructure having primary remote configuration data. The primary remote configuration data can then be communicated to the service infrastructure such that the service infrastructure can be configured in a final configuration state.

As such, autonomous configuration of a service infrastructure in an edge datacenter can be achieved based on circumventing direct configuration using routing protocol configuration data and relying on an autonomous discovery services (e.g., sniff service or casting service) that identify discovered configuration data for an initial configuration of the service infrastructure to access remote configuration data for a final configuration of the service infrastructure.

With reference to FIG. 1, embodiments of the present disclosure can be discussed with reference to an exemplary distributed computing environment that is an operating environment for implementing functionality described herein of an autonomous configuration system 100. The autonomous configuration system 100 includes an edge datacenter 110 having an edge infrastructure 120 and an edge infrastructure configuration manager 122. The edge datacenter 110 also includes a service infrastructure 130 having a service infrastructure configuration manager 132. The service infrastructure configuration manager 132 can operate an autonomous discovery service 134. The autonomous configuration system 100 further includes a service provider infrastructure 150 having a provisioning manager 160 having remote configuration data 162. The components of the autonomous configuration system 100 may communicate with each other via a network 140, which may include, without limitation, one or more local area networks (LANs) and/or wide area networks (WANs). Such networking environments are commonplace in offices, enterprise-wide computer networks, intranets, and the Internet.

Figure 2:
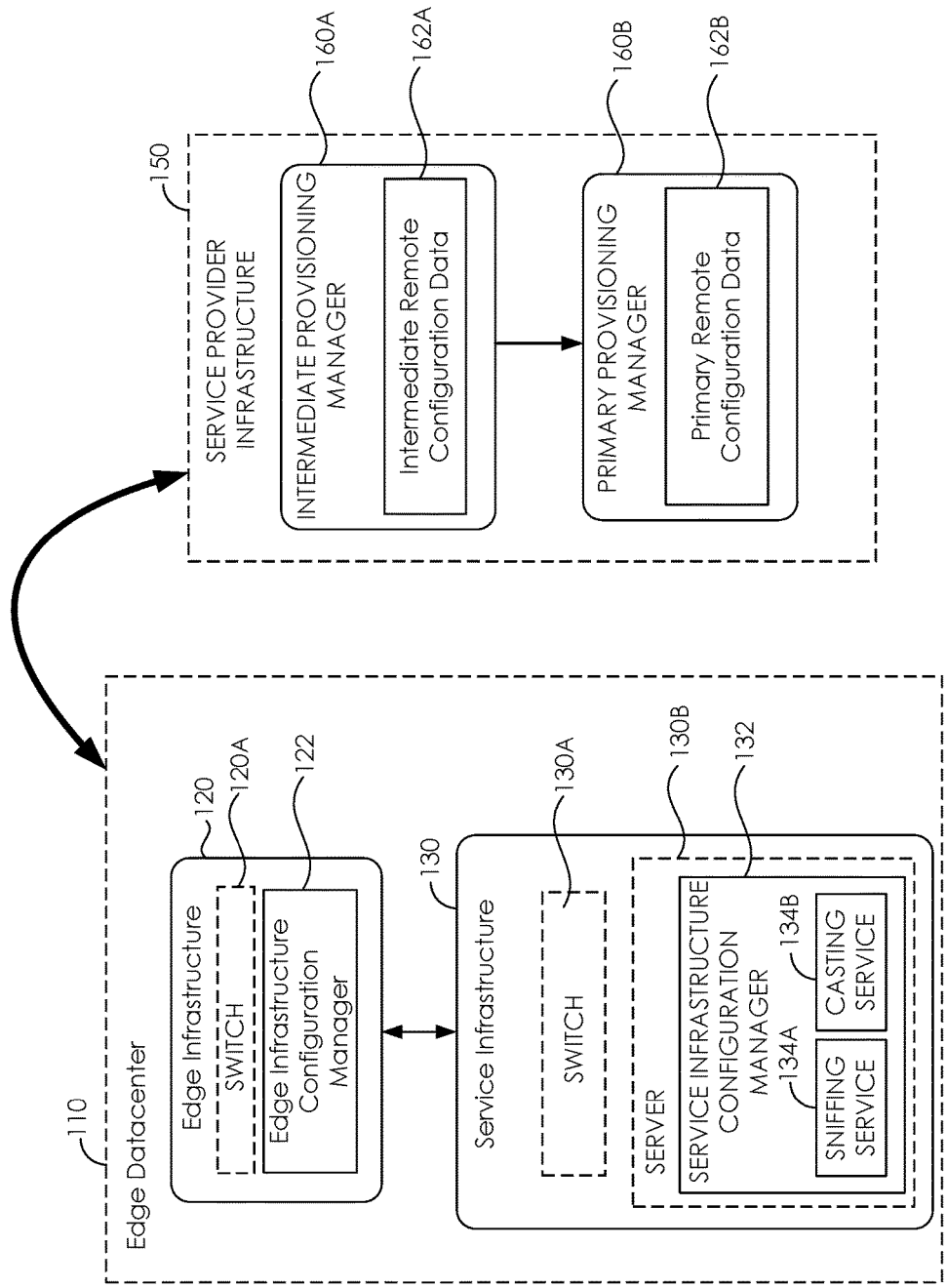
FIG. 2 is a block diagram of an exemplary distributed computing infrastructure and autonomous configuration system, in accordance with embodiments described herein.

The autonomous configuration system 100 in an alternative embodiment is illustrated in FIG. 2. FIG. 2 includes corresponding components shown in FIG. 1 with additional components supporting functionality of the autonomous configuration system. FIG. 2 includes the edge datacenter 110, the edge infrastructure 120, switch 120A, edge infrastructure configuration manager 122 and service infrastructure having a switch 130A and server 130B (e.g., blade on the rack) running the service infrastructure configuration manager 132. The service infrastructure configuration manager 132 can operate a sniffing service 134A and/or a casting service 134B as described herein in more detail. FIG. 2 further includes the service provider infrastructure 150 which, in one exemplary embodiment, supports an incremental provisioning process for security purposes. The service provider infrastructure 150 includes an intermediate provisioning manager 160A having intermediate remote configuration data 162A and a primary provisioning manager 160B having primary remote configuration data 162B.

A system, as used herein, refers to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. The system may be formed from other systems and components thereof. It should be understood that this and other arrangements described herein are set forth only as examples.

Having identified various components of the distributed computing environment, it is noted that any number of components may be employed to achieve the desired functionality within the scope of the present disclosure. The various components of FIG. 1 and FIG. 2 are shown with lines for the sake of clarity. Further, although some components of FIG. 1 and FIG. 2 are depicted as single components, the depictions are exemplary in nature and in number and are not to be construed as limiting for all implementations of the present disclosure. The autonomous configuration system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

With continued reference to FIG. 2, FIG. 2 includes the edge datacenter 110 that supports running hardware (e.g., power supplies, racks, and Network Interface Controllers (NIC)) and software components (Applications, Application Programming Interfaces (APIs), SQL Databases) that rely on each other to operate. The edge datacenter 110 provides housing for computing systems and associated components—collectively referred to as edge infrastructure or a service infrastructure when provided via a service provider that does not own and control the edge datacenter 110. The edge datacenter can specifically provide network access to the internet for service infrastructure (e.g., service infrastructure 130) running in the edge datacenter 110. The edge datacenter 110 through the edge infrastructure (e.g., edge infrastructure 120) supports configuring the service infrastructure 130 to have access to the internet. For example, the edge infrastructure 120 includes a network device (e.g., switch 120A) that links with the service infrastructure 130 to reach other autonomous networks (e.g., service provider infrastructure 150). In particular, a routing protocol (e.g., Border Gateway Protocol) can be configured on the switch 120A. When the edge infrastructure is linked over the routing protocol to the service infrastructure 130 (e.g. switch 130A) the routing protocol supports routing decisions for communications from the service infrastructure 130 based on paths, network policies, or rule-sets configured for making routing decisions.

The switch 120A operates with the edge infrastructure configuration manager 122 to support performing operations that provide the functionality of the switch 120A. The edge infrastructure configuration manager configures switch 120A in a waiting state. With embodiments described herein, the switch 120A upon a final configuration state of the service infrastructure 130 eventually operates based on the routing protocol; however, in order to implement autonomous configuration of the service infrastructure 130, the routing protocol is circumvented based on discovering configuration data (e.g., discovered configuration data) from the switch 120A while in the waiting state. The switch 120A is in a waiting state in that the switch has not been configured with a final configuration operating using the routing protocol.

The waiting state of the switch 120A can operate with an autonomous discovery service or an autonomous casting service: a sniffing-based process or a casting-based process. In the waiting state of the switch 120A in the sniffing-based process, the switch 120A is configured based on routing protocol configuration data and the switch 120A announces its presence using neighbor discovery operations. The switch 120A periodically sends out data packets and listens for a response from the switch 130A. In the waiting state of the switch 120A in the casting-based process, the switch 120A is also configured based on routing protocol configuration data and optionally (e.g., provided in advance from the service infrastructure provider) a casting IP address. The switch 120A responds to an advertisement of the casting IP address then starts casting IP address-based operations. Conventionally, the switch 130A can be configured manually and directly based on linking the switch 130A with the switch 120A using the routing protocol configuration data. However, with embodiments of the present invention, configuring the switch 130A for the routing protocol is circumvented, at least temporarily, to support automated configuration of the service infrastructure.

With continued reference to FIG. 2, service infrastructure 130 includes the switch 130A that can be configured in a final configuration state of the service infrastructure 130 to operate with the switch 120A using the routing protocol. The switch 130A in a pre-configuration state of the service infrastructure 130 for an autonomous discovery service, the switch 130A is configured to a transparent state where switch 130A operates to forward traffic received at the switch. The switch 130A can forward the data traffic to additional components (e.g., a server 130B running the service infrastructure configuration manager 132) in the service infrastructure 130. During the pre-configuration state, the service infrastructure configuration manager 132 can control operations in the service infrastructure 130 based on traffic (e.g., data packets) forwarded from the switch 130A in the transparent state. In this regard, the switch 130A which would conventionally be configured to operate with the switch 120A is, at least temporarily, bypassed for the service infrastructure configuration manager 132 to begin autonomous configuration of the service infrastructure 130. The switch 130A in a pre-configuration state of the service infrastructure 130 for an autonomous casting service can be configured with the casting IP address. The switch 130A alone or in combination with the casting service can operate to perform casting IP based operations to begin peering with the edge infrastructure 120. Other variations and combinations of pre-configuration states are contemplated with embodiments of the present disclosure.

The service infrastructure configuration manager 132 runs on server 130B to support autonomous configuration functionality. The service infrastructure configuration manager 132 can implement autonomous discovery service or autonomous casting services. For example, a sniffing service 134A that supports sniffing-based process for autonomous discovery or a casting service 134B that supports a casting-based process for autonomous configuration. The service infrastructure configuration manager 132 can be initialized in a pre-configuration state to support identifying discovered configuration data for autonomous discovery or accessing configuration data (e.g., casting IP address) for autonomous configuration. The discovered configuration data is used to configure the service infrastructure for access to the service provider infrastructure. For example, during a sniffing-based process the service infrastructure configuration manager listens for packets communicated from the switch 120A and identifies discovered configuration data. The discovered configuration data can be, for example, an IP address that is reserved and corresponds to a paired IP address in the switch 120A such that the service infrastructure is provided access to other autonomous networks.

In a casting-based process, the edge infrastructure 120 can be configured to listen for the presence of the casting IP address. In one embodiment, the service infrastructure manager configures the switch 130A based on the casting IP address such that the edge infrastructure can peer with the service infrastructure via the switch. The casting IP address is provided from the service provider to the service infrastructure to pre-configure the service infrastructure based on the casting IP address. The casting IP address links the server 130B and/or switch 130A to the switch 120A for access to the other autonomous networks (i.e., internet accessibility). In this regard, the service infrastructure configuration manager 132 can be in a pre-configuration state to access the casting configuration data to configure the service infrastructure in an initial configuration state for access to the service provider infrastructure and remote configuration data.

The service provider infrastructure 150 is configured to support a provisioning manager (e.g., provisioning manager 160, intermediate provisioning manager 160A and primary provisioning manager 160B) that provides remote configuration data (e.g., remote configuration data 162, intermediate remote configuration data 162A and primary remote configuration data 162B). The provisioning manager supports a provisioning process that allows the service infrastructure 130 to receive remote configuration data such that the service infrastructure 130 is configured to provide services of the service provider. The service infrastructure 130 can be configured to a final configuration that allows the service infrastructure 130 to support compute and storage operations for user accessing technology resources via the service infrastructure 130. For example, users can be given access to data repositories or granted authorization to systems, network applications and databases based on appropriate credentials. The service infrastructure final configuration, in particular, includes the switch 130A communicating with switch 120A using a routing protocol to direct communications from the service infrastructure 130. In this regard, the switch 130A can be specifically reconfigured from the transparent state in to the final configuration state as part of the final configuration of the service infrastructure 130. Additional components of the service infrastructure 130 are further fully provisioned using the remote configuration data and processes defined for configuring the service infrastructure 130.

As depicted in FIG. 2, the service provider infrastructure 150 can include an intermediate provisioning manager 160A and a primary provisioning manager 160B) that provides intermediate remote configuration data 162A and primary remote configuration data 162B. The automated configuration system 100 supports an incremental provisioning process that provides increased security in the autonomous configuration system. The incremental provisioning processing operates with the intermediate provisioning manager 160A to establish a preliminary trust between the service infrastructure 130 and the intermediate provisioning manager 160A. The intermediate provisioning manager 160A can communicate with the service infrastructure in the initial configuration state where the intermediate remote configuration data 162A is used to initialize an intermediate configuration state (e.g., a trust establishing state) at the service infrastructure. The trust establishing state can be based on any variations and combinations of trusted computing (e.g., endorsement key, memory curtaining, sealed storage, remote attestation, trusted third party, etc.) used to support communications between service infrastructure 130 and the service provider infrastructure 150 as part of establishing trust with the service infrastructure 130. In one exemplary embodiment, the service infrastructure establishes trust based authentication credentials (e.g., hardware or software based authentication credentials) communicated to the intermediate provisioning manager 160A. In operation, after a trust has been established then further communications can occur with the primary provisioning manager 160B having the primary remote configuration data 162B. The primary remote configuration data 162B can then be communicated to the service infrastructure 130 such that the service infrastructure can be configured in a final configuration state as discussed above.

Figure 3:
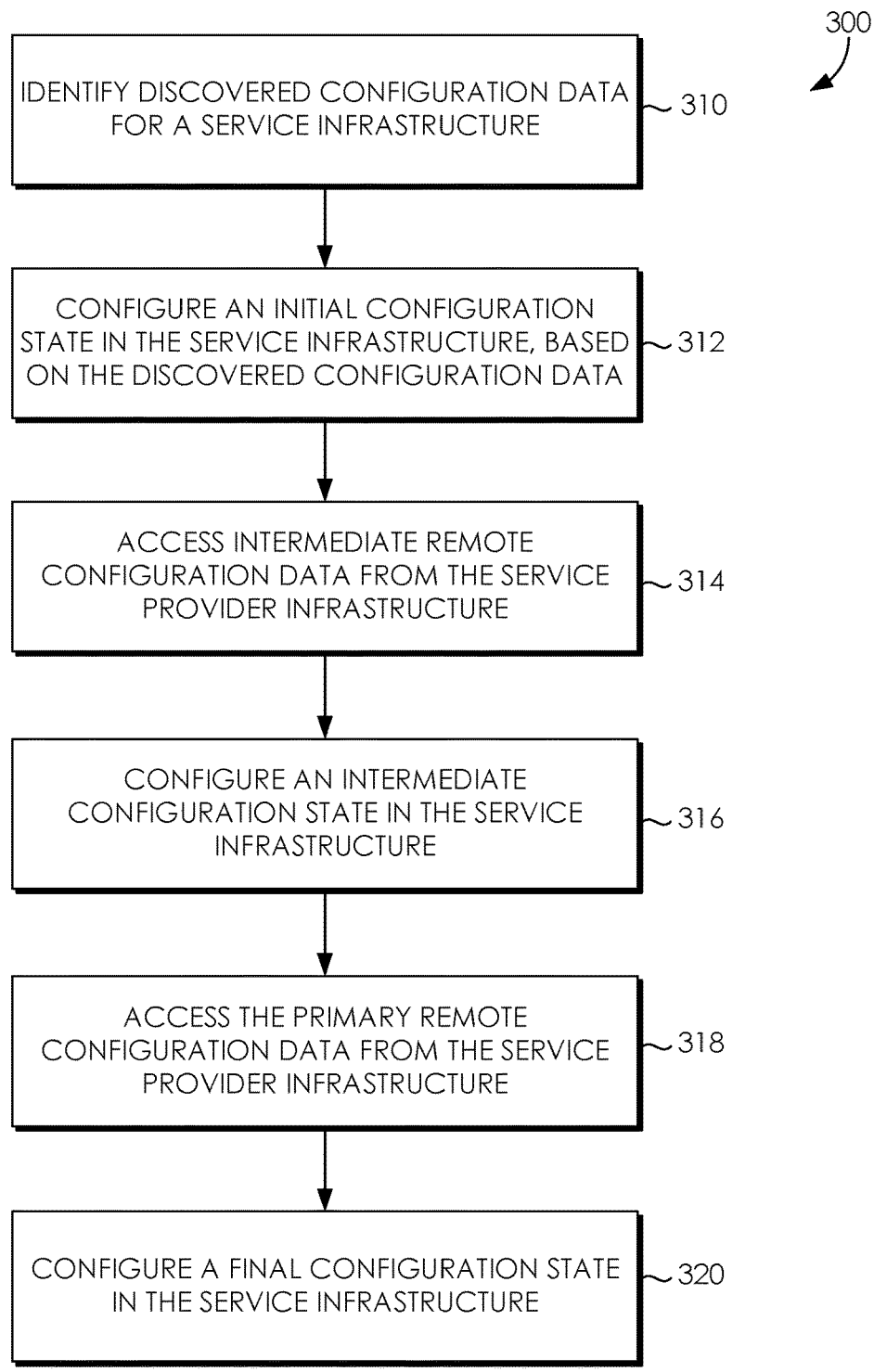
FIG. 3 is a flow diagram showing an exemplary method for providing an autonomous configuration system, in accordance with embodiments described herein.

Turning now to FIG. 3, a flow diagram is provided that illustrates a method 300 for providing autonomous configuration of service infrastructures. The method 300 can be performed using the autonomous configuration system described herein. In particular, one or more computer storage media having computer-executable instructions embodied thereon that, when executed, by one or more processors, can cause the one or more processors to perform the method 300. Initially at block 310, discovered configuration data or casting configuration data is identified or utilized, respectively, for a service infrastructure. The discovered configuration data or casting configuration data supports the service infrastructure to circumvent a routing protocol. The service infrastructure is alternatively configured to access remote configuration data based on the discovered configuration data or the casting configuration data, the discovered configuration data is discovered based on an autonomous discovery service and the casting configuration data is implemented based on an autonomous casting service.

In a first embodiment, the autonomous discovery service is a sniffing service, the sniffing service circumvents configuration of an anticipated switch of the service infrastructure and alternatively identifies the discovered configuration data based on monitoring data traffic that includes at least one reserved IP address. Using the autonomous discovery service, the discovered configuration data is identified from an edge infrastructure that operates in a waiting state to configure, based on the routing protocol (e.g., routing protocol configuration data), the edge infrastructure to link with the anticipated switch of the service infrastructure. In a second embodiment, the autonomous casting service is a casting service, the casting service circumvents configuration of an anticipated switch of the service infrastructure and alternatively utilizes the casting configuration data that comprises a casting IP address.

At block 312, an initial configuration state is configured in the service infrastructure, based on the discovered configuration data. In the initial configuration state, the service infrastructure can communicate with a service provider infrastructure associated with the service infrastructure to access remote configuration data. At block 314, a first portion of the remote configuration data is accessed from the service provider infrastructure, the first portion of the remote configuration data is intermediate remote configuration data from an intermediate provisioning manager. The intermediate provisioning manager in a service provider infrastructure operates to communicate intermediate remote configuration data for implementing an incremental provisioning process. The intermediate remote configuration data supports configuring the service infrastructure in the intermediate configuration state, the intermediate configuration state is a trust establishing state between the service infrastructure and the service provider infrastructure. At block 316, the intermediate configuration state is configured in the service infrastructure using the intermediate remote configuration data.

At block 318, a second portion of the remote configuration data is accessed from the service provider infrastructure. The second portion of the remote configuration data is primary remote configuration data from a primary provisioning manager. The primary provisioning manager in the service infrastructure operates to communicate primary remote configuration data for implementing the incremental provisioning process. The primary remote configuration data supports configuring the service infrastructure in the final configuration state. The final configuration state can include a switch of the edge infrastructure and a switch of service infrastructure communicating using the routing protocol, the routing protocol was previously circumvented based on the discovered configuration data. At block 320, the final configuration state is configured in the service infrastructure using the primary remote configuration data.

Figure 4:
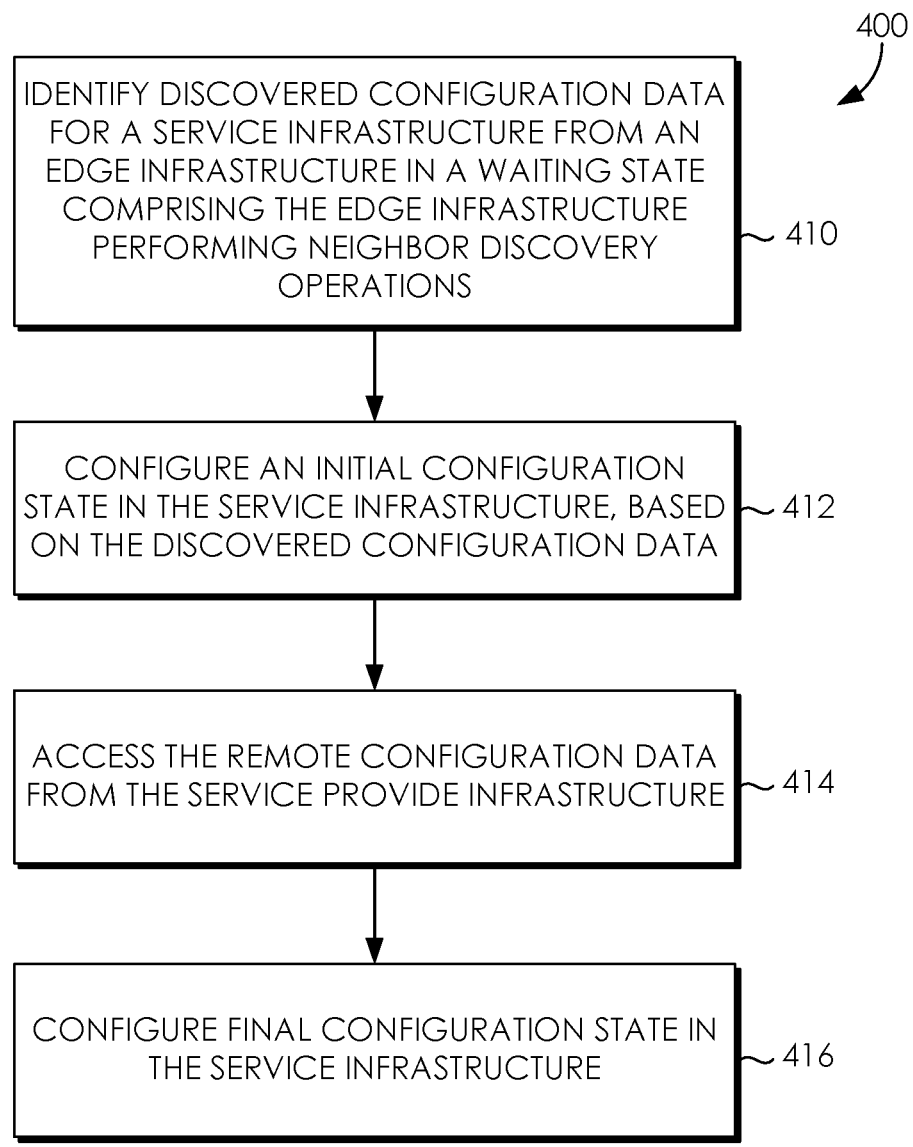
FIG. 4 is a flow diagram showing an exemplary method for providing an autonomous configuration system based on a sniffing service, in accordance with embodiments described herein.

Turning now to FIG. 4, a flow diagram is provided that illustrates a method 400 for providing autonomous configuration of service infrastructures. The method 400 can be performed using the autonomous configuration system described herein. Initially at block 410, discovered configuration data is identified for a service infrastructure from an edge infrastructure in a waiting state comprising the edge infrastructure performing neighbor discovery operations. The discovered configuration data supports the service infrastructure circumventing a routing protocol. The service infrastructure is alternatively configured to access remote configuration data based on the discovered configuration data, the discovered configuration data is discovered based on a sniffing service. The sniffing service circumvents configuration of the service infrastructure using the routing protocol to identify the discovered configuration data. The sniffing service identifies the discovered configuration data based on monitoring data traffic that comprises at least one reserved IP address. The sniffing service operates with the service infrastructure in a pre-configuration state comprising a switch of the service infrastructure in a transparent state, the switch forwards monitored data traffic to a service infrastructure configuration manager. At block 412, an initial configuration state is configured in the service infrastructure, based on the discovered configuration data. The service infrastructure can then communicate with the service provider infrastructure associated with the service infrastructure to access remote configuration data. At block 414, the remote configuration data is accessed from the service provider infrastructure. At block 416, a final configuration state is configured in the service infrastructure.

Figure 5:
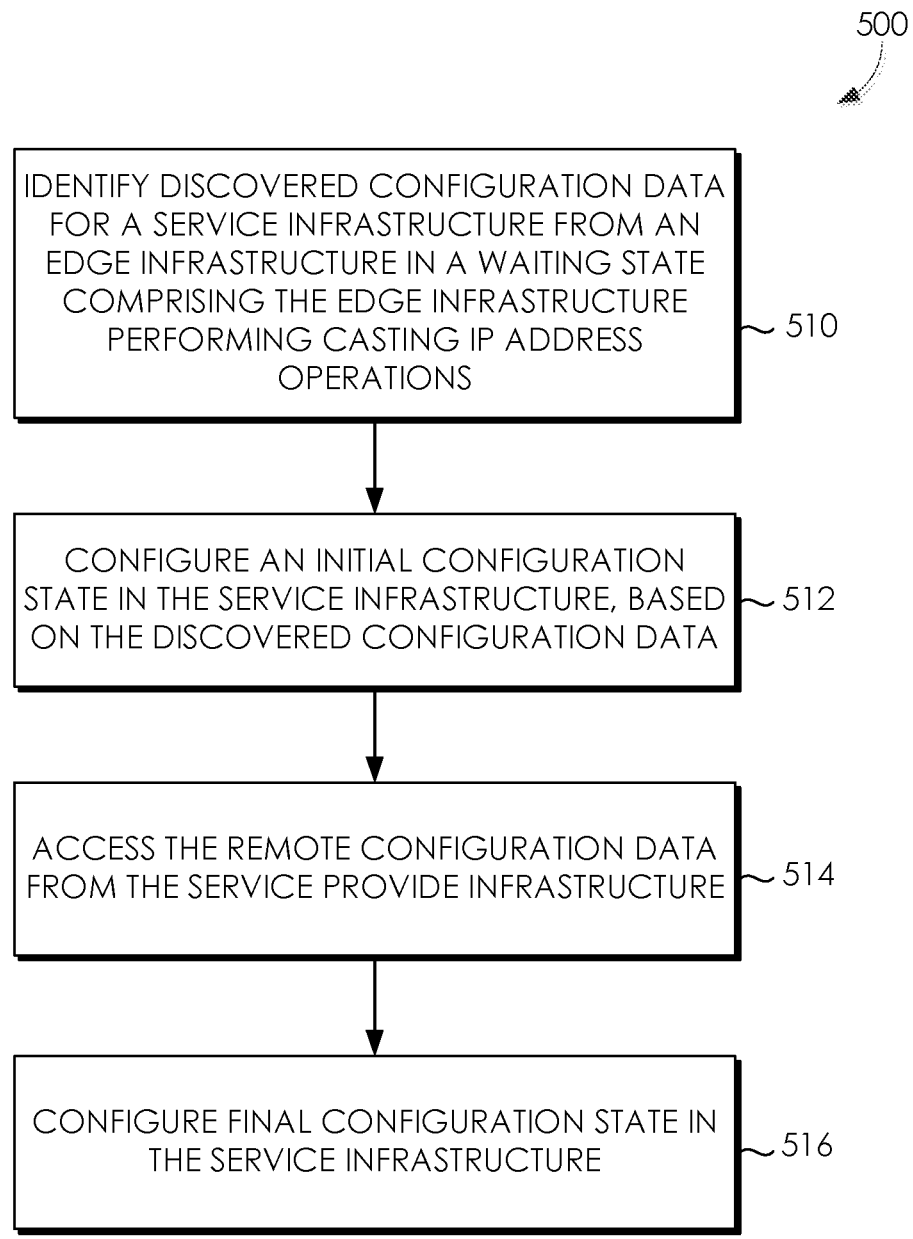
FIG. 5 is a flow diagram showing an exemplary method for providing an autonomous configuration system based on a casting service, in accordance with embodiments described herein.

Turning now to FIG. 5, a flow diagram is provided that illustrates a method 500 for providing autonomous configuration of service infrastructures. The method 500 can be performed using the autonomous configuration system described herein. Initially at block 510, discovered configuration data is identified for a service infrastructure from an edge infrastructure in a waiting state comprising the edge infrastructure performing casting IP address operations. The discovered configuration data supports the service infrastructure circumventing a routing protocol. The service infrastructure is alternatively configured to access remote configuration data based on the discovered configuration data. The casting service circumvents configuration of the service infrastructure using the routing protocol to identify the discovered configuration data. The casting service identifies the discovered configuration data based on monitoring data traffic that comprises a casting IP address. The casting service operates with the service infrastructure in a pre-configuration state comprising a switch of the service infrastructure in a transparent state, the switch forwards monitored data traffic to a service infrastructure configuration manager. At block 512, an initial configuration state is configured in the service infrastructure, based on the discovered configuration data. The service infrastructure can then communicate with a service provider infrastructure associated with the service infrastructure to access remote configuration data. At block 514, the remote configuration data is accessed from the service provider infrastructure. At block 516, a final configuration state is configured in the service infrastructure.

With reference to the autonomous configuration system, embodiments described herein support automatic and autonomous configuration of service infrastructure. The autonomous configuration system components refer to integrated components for autonomous configuration. The integrated components refer to the hardware architecture and software framework that support data access functionality using the autonomous configuration system. The hardware architecture refers to physical components and interrelationships thereof and the software framework refers to software providing functionality that can be implemented with hardware embodied on a device. The end-to-end software-based autonomous configuration system can operate within the autonomous configuration system components to operate computer hardware to provide autonomous configuration system functionality. As such, the autonomous configuration system components can manage resources and provide services for the autonomous configuration system functionality. Any other variations and combinations thereof are contemplated with embodiments of the present invention.

By way of example, the autonomous configuration system can include an API library that includes specifications for routines, data structures, object classes, and variables may support the interaction between the hardware architecture of the device and the software framework of the autonomous configuration system. These APIs include configuration specifications for the autonomous configuration system such that the different components therein can communicate with each other in the autonomous configuration system, as described herein.

Figure 6:
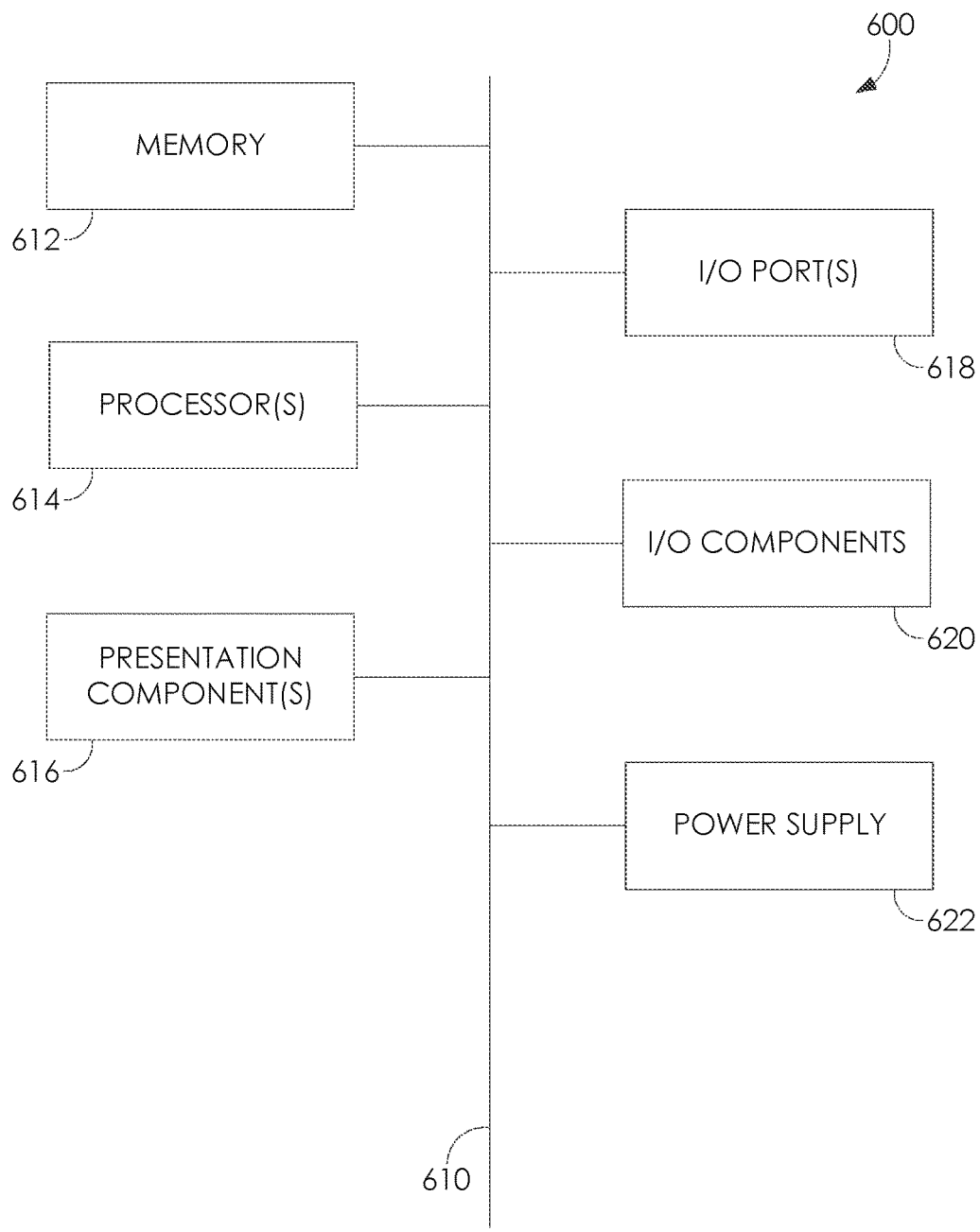
FIG. 6 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Figure 7:
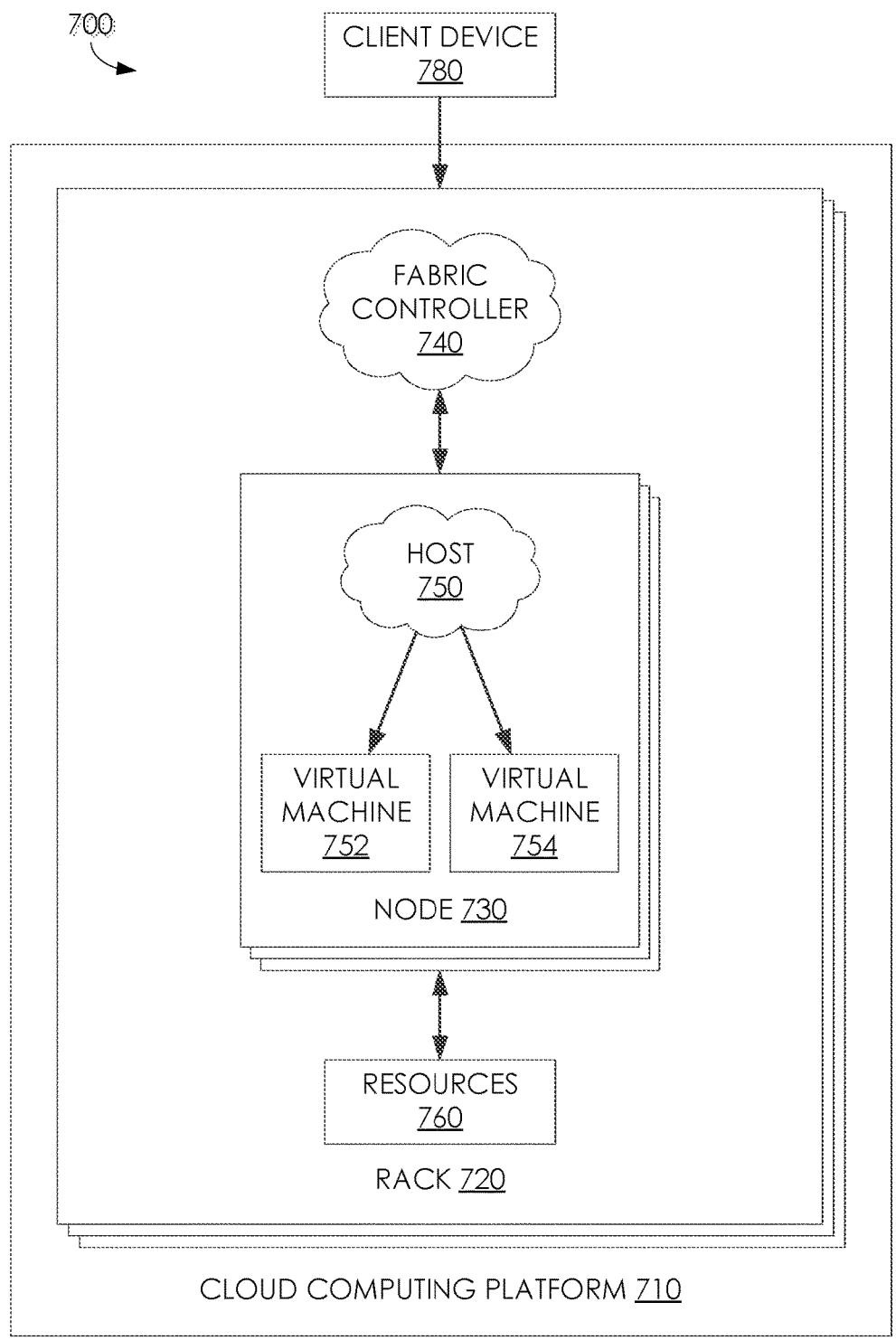
FIG. 7 is a block diagram of an exemplary computing environment suitable for use in implementing embodiments described herein.

Referring now to FIG. 7, FIG. 7 illustrates an exemplary distributed computing environment 700 in which implementations of the present disclosure may be employed. In particular, FIG. 7 shows a high level architecture of the autonomous configuration system ("system") in a cloud computing platform 710, where the system supports seamless modification of software component. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 700 that includes the cloud computing platform 710, rack 720, and node 730 (e.g., computing devices, processing units, or blades) in rack 720. The system can be implemented with a cloud computing platform 710 that runs cloud services across different data centers and geographic regions. The cloud computing platform 710 can implement a fabric controller 740 component for provisioning and managing resource allocation, deployment, upgrade, and management of cloud services. Typically, the cloud computing platform 710 acts to store data or run service applications in a distributed manner. The cloud computing infrastructure 710 in a data center can be configured to host and support operation of endpoints of a particular service application. The cloud computing infrastructure 710 may be a public cloud, a private cloud, or a dedicated cloud.

The node 730 can be provisioned with a host 750 (e.g., operating system or runtime environment) running a defined software stack on the node 730. Node 730 can also be configured to perform specialized functionality (e.g., compute nodes or storage nodes) within the cloud computing platform 710. The node 730 is allocated to run one or more portions of a service application of a tenant. A tenant can refer to a customer utilizing resources of the cloud computing platform 710. Service application components of the cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by the nodes 730, the nodes may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in the cloud computing platform 710. It is contemplated that resources can be configured for specific service applications. Further, each service application may be divided into functional portions such that each functional portion is able to run on a separate virtual machine. In the cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in the cloud computing platform 710. The client device 780 may be any type of computing device, which may correspond to computing device 700 described with reference to FIG. 7, for example. The client device 780 can be configured to issue commands to cloud computing platform 710. In embodiments, client device 780 may communicate with service applications through a virtual Internet Protocol (IP) and load balancer or other means that directs communication requests to designated endpoints in the cloud computing platform 710. The components of cloud computing platform 710 may communicate with each other over a network (not shown), which may include, without limitation, one or more local area networks (LANs) and/or wide area networks (WANs).

Having described various aspects of the distributed computing environment 700 and cloud computing platform 710, it is noted that any number of components may be employed to achieve the desired functionality within the scope of the present disclosure. Although the various components of FIG. 7 are shown with lines for the sake of clarity, in reality, delineating various components is not so clear, and metaphorically, the lines may more accurately be grey or fuzzy. Further, although some components of FIG. 7 are depicted as single components, the depictions are exemplary in nature and in number and are not to be construed as limiting for all implementations of the present disclosure.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the autonomous configuration system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for implementing autonomous configuration of service infrastructures, the system comprising:
    one or more hardware processors and memory storing computer-executable instructions and components embodied thereon that, when executed, by the one or more hardware processors, cause the hardware processors to execute:
    a service infrastructure configuration manager to:
        identify discovered configuration data or casting configuration data for a service infrastructure, wherein the discovered configuration data or the casting configuration data supports the service infrastructure circumventing a routing protocol such that the service infrastructure is alternatively configured to access remote configuration data based on the discovered configuration data or casting configuration data, the discovered configuration data is discovered based on an autonomous discovery service or the casting configuration data is identified based on an autonomous casting service;
        configure an initial configuration state in the service infrastructure, based on the discovered configuration data or the casting configuration data, such that the service infrastructure can communicate with a service provider infrastructure associated with the service infrastructure to access remote configuration data;
        access the remote configuration data from the service provider infrastructure; and
        configure a final configuration state in the service infrastructure.

2. The system of claim 1, further comprising:
    an edge infrastructure configuration manager to:
    maintain routing protocol configuration data for an edge infrastructure and a service infrastructure, wherein the edge infrastructure configuration manager supports the configuration of the service infrastructure based on a routing protocol of the routing protocol configuration data, wherein a switch of the edge infrastructure configured based on the routing protocol configuration data and storing a portion of a service infrastructure portion of the routing protocol configuration data, the routing protocol configuration data allows a switch of the service infrastructure to communicate with the switch of the edge infrastructure based on the routing protocol; and operate in a waiting state to facilitate configuration of the service infrastructure, wherein the waiting state comprises the switch of the edge infrastructure configured based on the routing protocol and performing waiting state operations in anticipation of configuring a link between the switch of the edge infrastructure configuration and the switch of service infrastructure.

3. The system of claim 1, wherein the discovered configuration data is identified from an edge infrastructure that operates in a waiting state to configure, based on the routing protocol, the edge infrastructure to link with an anticipated switch of the service infrastructure.

4. The system of claim 1, wherein the casting configuration data is configured in the service infrastructure, the casting configuration data comprises a casting IP address for the service infrastructure to peer with an edge infrastructure that operates in a waiting state to configure, based on the routing protocol, the edge infrastructure to link with an anticipated switch of the service infrastructure.

5. The system of claim 4, wherein peering the service infrastructure with the edge infrastructure provides the service infrastructure internet accessibility such that the service infrastructure broadcasts based on the casting IP address to receive communications from a service provider infrastructure.

6. The system of claim 1, wherein the autonomous discovery service is a sniffing service that circumvents configuration of the service infrastructure using the routing protocol, wherein the sniffing service identifies the discovered configuration data based on monitoring data traffic that comprises at least one reserved IP address.

7. The system of claim 1, wherein the autonomous casting service is a casting service that circumvents configuration of the service infrastructure using the routing protocol, wherein the casting service utilizes the casting configuration data to peer with an edge infrastructure.

8. The system of claim 1, further comprising an intermediate provisioning manager in the service provider infrastructure to communicate intermediate remote configuration data for implementing an incremental provisioning process, wherein the intermediate remote configuration data supports configuring the service infrastructure in an intermediate configuration state, the intermediate configuration state is a trust establishing state between the service infrastructure and the service provider infrastructure.

9. The system of claim 1, further comprising a primary provisioning manager in the service provider infrastructure to communicate primary remote configuration data for implementing the incremental provisioning process, wherein the primary remote configuration data supports configuring the service infrastructure in a final configuration state, the final configuration state comprising a switch of the edge infrastructure and a switch of the service infrastructure communicating using the routing protocol which was previously circumvented based on the discovered configuration data.

10. A computer-implemented method for providing autonomous configuration of service infrastructures, the method comprising:
identifying discovered configuration data for a service infrastructure, wherein the discovered configuration data supports the service infrastructure circumventing a routing protocol such that the service infrastructure is alternatively configured to access remote configuration data based on the discovered configuration data, the discovered configuration data is discovered based on an autonomous discovery service;
configuring an initial configuration state in the service infrastructure, based on the discovered configuration data such that the service infrastructure can communicate with a service provider infrastructure associated with the service infrastructure to access remote configuration data;
accessing the remote configuration data from the service provider infrastructure; and
configuring a final configuration state in the service infrastructure.

11. The method of claim 10, wherein the discovered configuration data is identified from an edge infrastructure that operates in a waiting state to configure, based on the routing protocol, the edge infrastructure to link with an anticipated switch of the service infrastructure.

12. The method of claim 11, wherein the edge infrastructure in the waiting state performs neighbor discovery operations to link with the anticipated switch of the service infrastructure.

13. The method of claim 10, wherein the autonomous discovery service is a sniffing service, the sniffing service circumvents configuration of the service infrastructure using the routing protocol to identify the discovered configuration data.

14. The method of claim 13, wherein the sniffing service identifies the discovered configuration data based on monitoring data traffic that comprises at least one reserved IP address.

15. The method of claim 10, wherein the sniffing service operates with the service infrastructure in a pre-configuration state comprising a switch of the service infrastructure in a transparent state, the switch forwards monitored data traffic to a service infrastructure configuration manager.

16. One or more computer storage media having computer-executable instructions embodied thereon that, when executed, by one or more processors, causes the one or more processors to perform a method for providing autonomous configuration of service infrastructures, the method comprising:
identifying discovered configuration data for a service infrastructure, wherein the discovered configuration data supports the service infrastructure circumventing a routing protocol such that the service infrastructure is alternatively configured to access remote configuration data based on the discovered configuration data, the discovered configuration data is discovered based on an autonomous discovery service;
configuring an initial configuration state in the service infrastructure, based on the discovered configuration data, such that, the service infrastructure can communicate with a service provider infrastructure associated with the service infrastructure to access remote configuration data;
accessing a first portion of the remote configuration data from the service provider infrastructure, wherein the first portion of the remote configuration data is intermediate remote configuration data from an intermediate provisioning manager;
configuring an intermediate configuration state in the service infrastructure using the intermediate remote configuration data;
accessing a second portion of the remote configuration data from the service provider infrastructure, wherein the second portion of the remote configuration data is primary remote configuration data from a primary provisioning manager; and configuring a final configuration state in the service infrastructure using the primary remote configuration data.

17. The media of claim 16, wherein the discovered configuration data is identified from an edge infrastructure that operates in a waiting state to configure, based on the routing protocol, the edge infrastructure to link with an anticipated switch of the service infrastructure, wherein the autonomous discovery service is a sniffing service, the sniffing service circumvents configuration of the anticipated switch and alternatively identifies the discovered configuration data based on monitoring data traffic that comprises at least one reserved IP address.

18. The media of claim 16, wherein the discovered configuration data is identified from an edge infrastructure that operates in a waiting state to configure, based on the routing protocol, the edge infrastructure to link with an anticipated switch of the service infrastructure, wherein the autonomous discovery service is a casting service, the casting service circumvents configuration of the anticipated switch and alternatively identifies the discovered configuration data based on monitoring data traffic that comprises a casting IP address.

19. The media of claim 16, wherein the intermediate provisioning manager in a service provider infrastructure operates to communicate intermediate remote configuration data for implementing an incremental provisioning process, wherein the intermediate remote configuration data supports configuring the service infrastructure in the intermediate configuration state, the intermediate configuration state is a trust establishing state between the service infrastructure and the service provider infrastructure.

20. The media of claim 16, wherein the primary provisioning manager in the service infrastructure operates to communicate primary remote configuration data for implementing the incremental provisioning process, wherein the primary remote configuration data supports configuring the service infrastructure in the final configuration state, the final configuration state comprising a switch of the edge infrastructure and a switch of the service infrastructure communicating using the routing protocol which was previously circumvented based on the discovered configuration data.

* * * * *